US012793390B1

(12) United States Patent
Hansen

(10) Patent No.: US 12,793,390 B1
(45) Date of Patent: Nov. 10, 2026

(54) IMAGE CAPTURE VERIFICATION AND FEATURE DETECTION SYSTEM WITH USER FEEDBACK

(71) Applicant: CoreLogic Solutions, LLC, Irvine, CA (US)

(72) Inventor: Steven Hansen, San Diego, CA (US)

(73) Assignee: CoreLogic Solutions, LLC, Irvine, CA (US)

( * ) Notice: Subject to any disclaimer, the term of this patent is extended or adjusted under 35 U.S.C. 154(b) by 243 days.

(21) Appl. No.: 18/407,195

(22) Filed: Jan. 8, 2024

Related U.S. Application Data

(60) Provisional application No. 63/439,031, filed on Jan. 13, 2023, provisional application No. 63/439,032, filed on Jan. 13, 2023.

(51) Int. Cl.

| | |
|---|---|
| ***G06V 10/70*** | (2022.01) |
| ***G06V 10/776*** | (2022.01) |
| ***G06V 10/82*** | (2022.01) |
| ***G06V 20/10*** | (2022.01) |
| ***G06V 20/70*** | (2022.01) |

(52) U.S. Cl.
CPC .......... *G06V 10/768* (2022.01); *G06V 10/776* (2022.01); *G06V 10/82* (2022.01); *G06V 20/176* (2022.01); *G06V 20/70* (2022.01)

(58) Field of Classification Search
USPC .......................................... 382/155–156, 159
See application file for complete search history.

(56) References Cited

U.S. PATENT DOCUMENTS

| | | | | |
|---|---|---|---|---|
| 9,256,806 | B2 * | 2/2016 | Aller | G06V 40/168 |
| 9,507,420 | B2 * | 11/2016 | Tartz | H04N 23/64 |
| 10,574,881 | B2 * | 2/2020 | Oleson | H04N 23/632 |
| 11,555,701 | B2 * | 1/2023 | Du | G06N 3/08 |
| 12,118,770 | B2 * | 10/2024 | Wei | G06V 10/40 |
| 2019/0253614 | A1 * | 8/2019 | Oleson | H04N 23/62 |
| 2020/0014816 | A1 * | 1/2020 | Speasl | H04N 1/00129 |
| 2020/0348132 | A1 * | 11/2020 | Du | G06V 20/20 |
| 2023/0096921 | A1 * | 3/2023 | Wei | G06V 10/82 382/103 |

* cited by examiner

*Primary Examiner* — Ishrat I Sherali
(74) *Attorney, Agent, or Firm* — Knobbe, Martens, Olson & Bear, LLP

(57) ABSTRACT

Systems and methods that utilize image recognition techniques to verify images from an image capture user interface are described herein. The image verification functionality can continually update a user on whether the scene to which a camera of a user device is directed includes content being requested. For example, the system can use artificial intelligence to perform the verification. The verification may occur even if the user has not yet selected an option to capture an image of a scene in view of the camera. The system can further use artificial intelligence to automatically tag images to include a description of content depicted therein.

20 Claims, 11 Drawing Sheets

IMAGE CAPTURE VERIFICATION AND FEATURE DETECTION SYSTEM WITH USER FEEDBACK

CROSS-REFERENCED TO RELATED APPLICATIONS

This application claims the benefit of U.S. Provisional Patent Application No. 63/439,032, entitled "IMAGE CAPTURE VERIFICATION AND FEATURE DETECTION SYSTEM WITH USER FEEDBACK" and filed on Jan. 13, 2023, and of U.S. Provisional Patent Application No. 63/439,031, entitled "IMAGE CAPTURE VERIFICATION AND FEATURE DETECTION SYSTEM WITH USER FEEDBACK" and filed on Jan. 13, 2023, which are hereby incorporated by reference herein in their entireties.

TECHNICAL FIELD

The present disclosure relates to systems that use artificial intelligence to validate images provided by a user.

BACKGROUND

In some cases, an entity may desire a copy of data that has been captured by a user or stored on a user device of the user. For example, the entity may desire a copy of a document, an image, a video file, an audio file, and/or any other type of data that the user may have captured or stored on a local device. Typical servers or other computing systems include functionality that allow an entity to create a content page (e.g., a network page, a web page, etc.) that includes buttons or other user interface features for requesting and receiving data from a user. A user can visit the content page using the user device and follow relevant prompts to select data to upload. Once the user confirms that the correct data has been selected for upload, the user device may begin transferring the selected data to the server or other computing system via a network.

SUMMARY

The systems, methods, and devices described herein each have several aspects, no single one of which is solely responsible for its desirable attributes. Without limiting the scope of the disclosure, several non-limiting features will now be discussed briefly.

One aspect of the disclosure provides a system for performing image analysis. The system comprises a memory that stores computer-executable instructions. The system further comprises a processor in communication with the memory, wherein the computer-executable instructions, when executed by the processor, cause the processor to: process an image and image data obtained from an image capture application running on a user device, wherein the image is obtained from the image capture application prior to a user selecting an option to capture the image; select an image recognition artificial intelligence model using the image data; apply the image as an input to the image recognition artificial intelligence model, wherein the image recognition artificial intelligence model outputs an indication of one or more features in the image; determine that a first feature associated with a first type of object is not comprised within the one or more features; and in response to the determination that the first feature associated with the first type of object is not comprised within the one or more features, cause a prompt to appear in the image capture application that indicates that the image depicts an object other than the first type of object and instructs a user to adjust image capture.

The system of the preceding paragraph can include any sub-combination of the following features: where the image data comprises data indicating at least one of a direction from which the image was captured or an elevation at which the image was captured; where the image recognition artificial intelligence model is a model trained to recognize a set of one or more features within a specific scene or scene; where the scene comprises a portion of a real estate property; where the computer-executable instructions, when executed, further cause the processer to determine a confidence rating for each feature found in the image; where the prompt is caused to appear in response to the confidence rating for one feature of the one or more features being below a threshold value; and where the computer-executable instructions, when executed, further cause the processer to train the image recognition artificial intelligence model using training data that comprises an image annotated to indicate at least one of a weather at a location at which the image is captured, a direction a camera that captured the image was facing, or a time at which the image was captured.

Another aspect of the disclosure provides a computer-implemented method comprising: receiving an image and image data obtained from an image capture application running on a user device, wherein the image is obtained from the image capture application prior to a user selecting an option to capture the image; selecting an image recognition artificial intelligence model using the image data; applying the image as an input to the image recognition artificial intelligence model, wherein the image recognition artificial intelligence model outputs one or more features in the image; determining that a first feature associated with a first type of object is not comprised within the one or more features; and in response to the determination that the first feature associated with the first type of object is not comprised within the one or more features, causing a prompt to appear in the image capture application that indicates that the image depicts an object other than the first type of object and instructs a user to adjust image capture.

The computer-implemented method of the preceding paragraph can include any sub-combination of the following features: where the image data comprises data indicating at least one of a direction from which the image was captured or an elevation at which the image was captured; where the image recognition artificial intelligence model is a model trained to recognize a set of one or more features within a scene; where the scene comprises a portion of a real estate property; where the computer-implemented method further comprises determining a confidence rating for each feature found in the image; where the prompt is caused to appear in response to the confidence rating for one feature of the one or more features being below a threshold value; and where the computer-implemented method further comprises training the image recognition artificial intelligence model using training data that comprises an image annotated to indicate at least one of a weather at a location at which the image is captured, a direction a camera that captured the image was facing, or a time at which the image was captured Another aspect of the disclosure provides a non-transitory, computer-readable medium comprising computer-executable instructions for analyzing an image, wherein the computer-executable instructions, when executed by a computer system, cause the computer system to: process an image and image data obtained from an image capture application running on a user device, wherein the image is obtained from the image capture application prior to a user selecting an option to capture the image; select an image recognition artificial intelligence model using the image data; apply the image as an input to the image recognition artificial intelligence model, wherein the image recognition artificial intelligence model outputs one or more features in the image; determine that a first feature associated with a first type of object is not comprised within the one or more features; and in response to the determination that the first feature associated with the first type of object is not comprised within the one or more features, cause a prompt to appear in the image capture application that indicates that the image depicts an object other than the first type of object and instructs a user to adjust image capture.

The non-transitory, computer-readable medium of the preceding paragraph can include any sub-combination of the following features: where the image data comprises data indicating at least one of a direction from which the image was captured or an elevation at which the image was captured; where the image recognition artificial intelligence model is a model trained to recognize a set of one or more features within a scene; where the scene comprises a portion of a real estate property; where the computer-executable instructions, when executed, further cause the computer system to determine a confidence rating for each feature found in the image; and where the prompt is caused to appear in response to the confidence rating for one feature of the one or more features being below a threshold value.

Another aspect of the disclosure provides a system for performing image analysis. The system comprises a memory that stores computer-executable instructions. The system further comprises a processor in communication with the memory, wherein the computer-executable instructions, when executed by the processor, cause the processor to: process an image and image data obtained from an image capture application running on a user device; select an image recognition artificial intelligence model using the image data; apply the image as an input to the image recognition artificial intelligence model, wherein the image recognition artificial intelligence model outputs one or more detected features in the image; and apply one or more tags to the image based on the one or more detected features that identify content depicted in the image.

The system of the preceding paragraph can include any sub-combination of the following features: where the computer-executable instructions, when executed by the processor, further cause the processor to use the one or more tags to verify if a caption applied to the image by a user is correct; where the computer-executable instructions, when executed by the processor, further cause the processor to use the one or more tags to one of arrange or filter images that have been uploaded; and where the computer-executable instructions, when executed by the processor, further cause the processor to use the one or more tags to create image reports that are one of categorized or indexed by the one or more tags.

Another aspect of the disclosure provides a system for performing image analysis. The system comprises a memory that stores computer-executable instructions. The system further comprises a processor in communication with the memory, wherein the computer-executable instructions, when executed by the processor, cause the processor to: process an image and image data obtained from an image capture application running on a user device, wherein the image is obtained from the image capture application prior to a user selecting an option to capture the image; select an image recognition artificial intelligence model using the image data; and apply the image as an input to the image recognition artificial intelligence model, wherein the image recognition artificial intelligence model outputs an indication of one or more features in the image.

The system of the preceding paragraph can include any sub-combination of the following features: where the computer-executable instructions, when executed, further cause the processer to: determine that a first feature associated with a first type of object is not comprised within the one or more features, and in response to the determination that the first feature associated with the first type of object is not comprised within the one or more features, cause a prompt to appear in the image capture application that indicates that the image depicts an object other than the first type of object and instructs a user to adjust image capture; and where the computer-executable instructions, when executed, further cause the processer to apply one or more tags to the image based on the one or more features that identify content depicted in the image.

DETAILED DESCRIPTION OF EMBODIMENTS

Figure 1A:
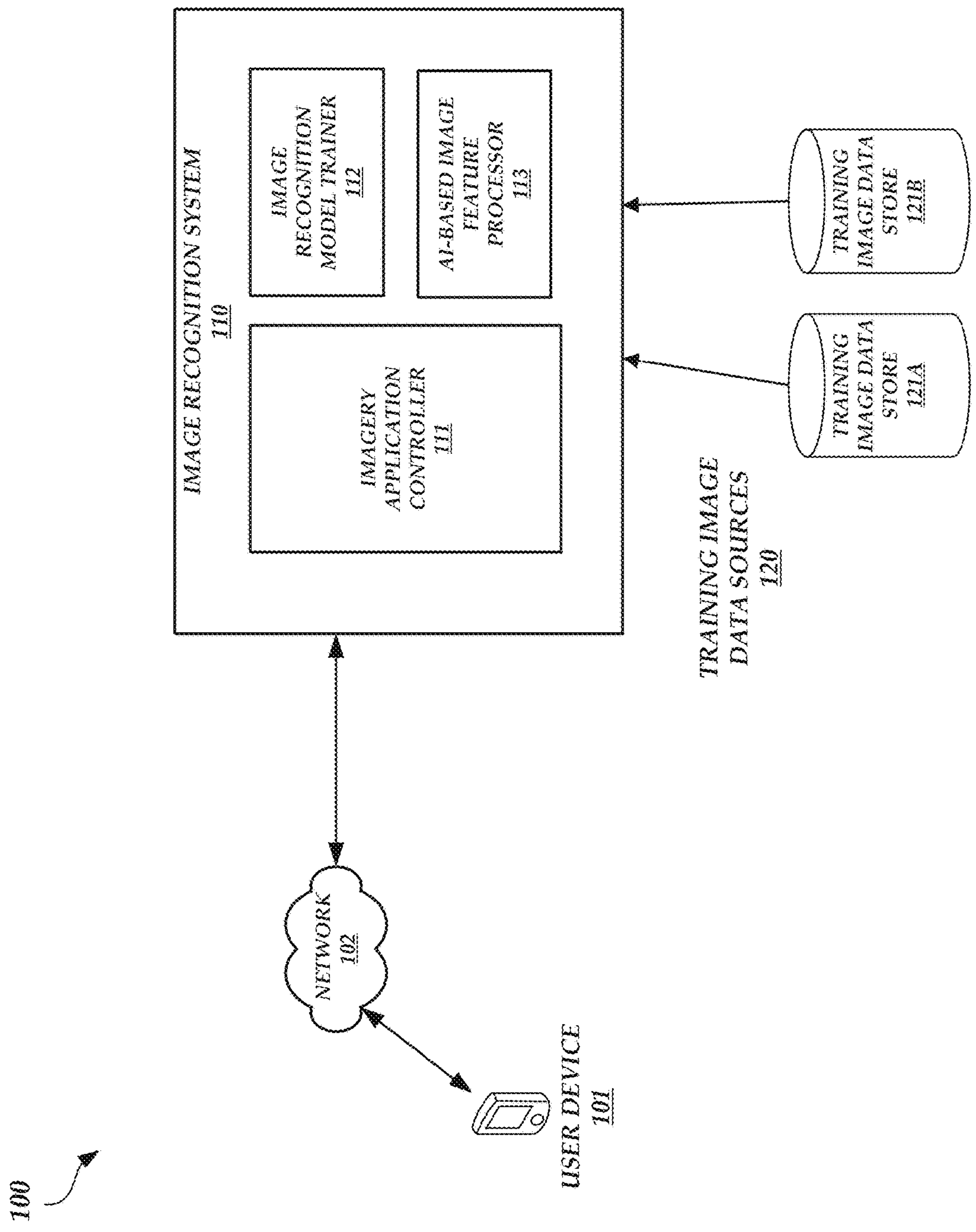
FIG. 1A is an exemplary block diagram of an image recognition environment 100 that captures and processes images according to various embodiments of the present disclosure.

In the following description, for purposes of explanation, specific details are set forth in order to provide an understanding of the invention. It will be apparent, however, to one skilled in the art that the invention can be practiced without these details.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components.

Furthermore, connections between components or systems within the figures are not intended to be limited to direct connections. Rather, data between these components may be modified, re-formatted, or otherwise changed by intermediary components. Also, additional or fewer connections may be used.

As discussed above, typical servers or other computing systems include functionality that allow an entity to create a content page (e.g., a network page, a web page, etc.) that includes buttons or other user interface features that allow a user to upload requested data to the server or computing system. In some cases, the user may accidentally or intentionally transmit incorrect data (e.g., data that was not requested by the entity, such as data that depicts or includes content other than the content requested by the entity), data that includes content that is incomplete, data that includes content that is illegible, data that is corrupted, and/or the like. Generally, the data uploaded by the user may be reviewed by the typical server or computing system once the data is received. If the typical server or computing system determines that the uploaded data is not the requested data or is low quality data, then the typical server or computing system may notify the user of the discrepancy and request that the user re-capture or re-retrieve the correct data.

In certain instances, the notification sent to the user to re-capture or re-retrieve the correct data may arrive too late. For example, by the time the user receives the notification, the user may no longer be able to or be in a position to re-capture or re-retrieve the requested data. As an illustrative example, an entity may request an image of an air conditioning unit of a structure. By mistake, the user may capture an image of a heating unit of the structure and upload the image of the heating unit via the content page. The user may no longer have access to the structure or the property on which the structure is located once the notification to re-capture the image is received.

Some typical servers or computing systems attempt to resolve the issues with delayed notification by providing suggestions during the capture process. For example, a user interface feature of a content page may, when selected by a user, cause the user device of the user to open a camera application. The camera application may allow a user to capture an image that can then be uploaded to the typical server or computing system. The typical server or computing system may configure or otherwise cause the camera application to provide one or more suggestions to the user as the user attempts to capture an image. For example, the camera application may suggest to the user to increase the brightness of the location to enhance the quality of the captured image, to move closer to the subject of the image to enhance the quality of the captured image, to move farther away from the subject of the image to enhance the quality of the captured image, to adjust the focus to enhance the quality of the captured image, and/or the like.

While these typical servers or computing systems may be able to improve the quality of an image during the capture process via the suggestions provided by the camera application, these typical servers or computing systems still do not address situations in which the content depicted in a captured image is not the content being requested. As a result, users may still receive delayed notifications indicating that the requested data should be re-captured or re-retrieved.

Accordingly, disclosed herein is an image recognition system that resolves the above-described technical deficiencies of typical servers or computing systems. For example, the system described herein can use artificial intelligence to discern if an image that is to be captured via a camera or photo capture application (or image capture application) of a user device depicts content being requested. The system described herein can make the determination of whether the image that is to be captured depicts content being requested while the camera or photo capture application is open and prior to a user selecting an option to capture the image. If the system described herein determines that the image to be captured does not depict the requested content, the system described herein can cause the camera or photo capture application to provide feedback to the user via the application such that the user can make an adjustment and capture an image of the requested content. As used herein, a "user" can be a homeowner, a contractor, a builder, an insurance agent, an inspector, a technician, and/or any other person tasked with capturing a photo of a building, structure, or other object.

For example, the system described herein can train one or more image recognition models to recognize one or more features in an image. Optionally, each image recognition model may be associated with a specific type of object or item and trained to recognize one or more features of that specific type of object or item.

The system described herein can cause a content page to identify a type of object or item to capture in an image. A user can select a user interface feature available in the content page to upload an image of a particular type of object or item, which may prompt the user to either retrieve the image from memory of the user device or to capture an image via a camera or photo capture application. If the user opts to capture an image via the photo capture application, then the user device may transition from the content page to a view of the photo capture application.

The camera of the user device may be activated when the photo capture application begins running, which causes the photo capture application to depict a scene captured by the camera (but not yet captured by a user for storage in memory of the user device as an image file). Either before or after the user selects a user interface feature to capture an image file based on the scene captured by the camera, the system described herein can cause an application running on the user device that displayed the content page to retrieve a trained image recognition model associated with the particular type of object or item, to request an image file from the photo capture application that depicts a scene on which the camera of the user device is currently focused, and/or to apply the image file as an input to the trained image recognition model. In response, the trained image recognition model may output an indication of whether one or more features expected to be found in an image depicting the specific type of object or item are found. If the output indicates that at least one expected feature is found (indicating that the user has or is about to capture an image of requested content), then the application that displays the content page can cause the photo capture application to display a notification indicating that the user has or is about to capture an image of the appropriate content (and optionally can prompt the user to capture the image for storage as an image file in memory of the user device or can automatically capture the image without user interaction). If the output indicates that some or none of the expected features are found (indicating that the user has or is about to capture an image that is of something other than the requested content), then the application that displays the content page can cause the photo capture application to display a notification indicating that the user has or is about to capture an image of incorrect content and to point the camera of the user device in a different direction, such as in a direction where the requested content may be located. In particular, the notification may include information indicating what the requested content may look like and/or where the requested content may be located, with the notification optionally including one or more images captured in the past of the specific object or item.

These operations may be repeated one or more times until an image is captured using the photo capture application and/or until an image captured using the photo capture application is verified based on the output of the trained image recognition model. Thus, the photo capture application may provide imagery data to the application that displays the content page, even before a user makes an affirmative choice to capture an image, so that the application that displays the content page can continually scan the scene that a user is about to capture to determine whether the user is about to capture the correct content or the incorrect content. As a result, a user can receive more immediate feedback on whether an image to be captured or that has been captured will be approved, thereby reducing the likelihood that the user receives delayed feedback that, in some circumstances, is too late to resolve the identified issue.

While the present application is generally described herein as relating to a system that analyzes images depicting a building or components thereof, a structure or components thereof, or other real estate assets, this is not meant to be limiting. The techniques described herein as being implemented by the system or various user device applications can be applied to other use cases outside of real estate where an image is to be analyzed and real-time (e.g., within a few milliseconds of an image being captured) or near real-time (e.g., within a few seconds to a minute of an image being captured) feedback on the content of the image is desired.

The foregoing aspects and many of the attendant advantages of this disclosure will become more readily appreciated as the same become better understood by reference to the following detailed description, when taken in conjunction with the accompanying drawings.

Example System Overview

FIG. 1A is an exemplary block diagram of an image recognition environment 100 that captures and processes images according to various embodiments of the present disclosure. Environment 100 comprises one or more user devices 101, one or more image recognition systems 110, and one or more training image data sources 120.

The image recognition system 110 may include an imagery application controller 111, an image recognition model trainer 112, and an artificial intelligence-based image feature processor 113. The imagery application controller 111 may be configured to instruct one or more applications running on a user device 101 to output data or perform an operation. The image recognition model trainer 112 may be configured to train one or more image recognition models using some or all of the images stored in the training image data sources 120 as training data. As described herein, the image recognition models may be artificial intelligence models (e.g., machine learning models, neural networks, etc.). The artificial intelligence-based image feature processor 113 may be configured to apply input data to one or more image recognition models, the output of which may be displayed by a user device 101 based on instructions provided by the imagery application controller 111.

While the artificial intelligence-based image feature processor 113 is depicted as being internal to the image recognition system 110, this is not meant to be limiting. For example, a user device 101 may execute an application with which a user can access a content page generated by the image recognition system 110 (e.g., referred to herein as a verification application), a photo capture application, and/or other applications. The verification application may implement some or all of the features of the artificial intelligence-based image feature processor 113. Thus, the verification application running on the user device 101 may use artificial intelligence to analyze an image captured or to be captured by the photo capture application and cause the photo capture application to display the appropriate notifications.

The training image data sources 120 may be comprised of one or more training image data stores 121A-B. The training image data stores 121A-B may store one or more images that are annotated to indicate one or more features of one or more objects or items depicted therein. As described herein, the image recognition model trainer 112 can retrieve some or all of the stored images to use as training data to train one or more image recognition models. For example, the image recognition model trainer 112 may train a general image recognition model to recognize one or more features depicted in an image regardless of the type of object or item depicted in the image. As another example, the image recognition model trainer 112 may train one or more image recognition models, where each model is associated with a particular type of object or item and is configured to identify one or more features of the particular type of object or item in an inputted image. To perform the training of an image recognition model associated with a particular type of object or item, the image recognition model trainer 112 can retrieve one or more images from the training data store(s) 121A-B that depict the particular type of object or item and use those images as training data to train the model. Thus, the image recognition model trainer 112 may repeat the training operation multiple times to train different image recognition models.

The image recognition system 110 can be a computing system configured to train image recognition models and to detect one or more features in one or more images captured or in about to be captured by one or more users. The image recognition system 110 may be a single computing device, or it may include multiple distinct computing devices, such as computer servers, logically or physically grouped together to collectively operate as a server system. The components of the image recognition system 110 can each be implemented in application-specific hardware (e.g., a server computing device with one or more ASICs) such that no software is necessary, or as a combination of hardware and software. In addition, the modules and components of the image recognition system 110 can be combined on one server computing device or separated individually or into groups on several server computing devices. In some embodiments, image recognition system 110 may include additional or fewer components than illustrated in FIG. 1A.

In some embodiments, the features and services provided by the image recognition system 110 may be implemented as web services consumable via the communication network 110. In further embodiments, the image recognition system 110 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The user device(s) 101 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. A user device 101 may execute an application (e.g., a browser, a stand-alone application, a verification application, a photo capture application, etc.) that allows a user to access a content page generated by the image recognition system 110, capture one or more images of content identified in the content page, and upload the captured images (e.g., to the image recognition system 110, to another system or data store, etc.).

The user device 101 may perform processing locally to validate an image captured or to be captured by the user device 101 or some or all of the processing may be performed by the image recognition system 110. For example, if processing locally, the user device 101 may execute a verification application and/or a photo capture application that collectively allow a user to access a content page generated by the image recognition system 110, prompt a user to provide one or more images for one or more types of objects or items (e.g., specific roof elements and/or counts (e.g., vents, material type, roof distortion, tarps, overhanging branches, etc.), air conditioning unit, heater unit, water heater, siding (e.g., material type, color, window type, etc.), flooring, window, appliance, shutters, downspouts, electrical meter, deck, grill, patio furniture, garden accessories, fencing, clothes, food, balcony, toilet, shower, sink, dining table, street sign, bed, parking meter, bench, chair, couch, potted plant, mirror, table, tent, tree, microwave, oven, toaster, refrigerator, blender, clock, vase, branch, bridge, building, bush, cabinet, carpet, ceiling, ceiling-tile, clouds, counter, cupboard, curtain, desk, dirt, door, floor-marble, floor-stone, floor-tile, floor-wood, flower, furniture, grass, gravel, ground, hill, house, leaves, light, mat, metal, moss, mountain, mud, napkin, net, paper, pavement, pillow, plant, railing, railroad, river, road, rock, rug, salad, sand, sea, shelf, sky, skyscraper, snow, solid, stairs, stone, straw, structural, traffic light, fire hydrant, stop sign, wall-brick, wall-drywall, wall, wall-panel, wall-stone, wall-tile, wall-wood, water, window-blind, wood, solar panels, skylights, pool, wine cellar, electrical outlet, electrical panel, countertops, side of a structure (e.g., front, back, side, aerial or top, etc.), oil tank, plumbing, trampoline, stove, generator, tankless water heater, washer, dryer, water heater, barbeque area, carport, detached garage, dresser, fireplace, gym or exercise area, office, pantry, playground, radiator, shower, bathroom tub, wood cabinets, unfinished basement, walk-in closet, chandelier, hot tub, sauna, stable or barn, theater or movie room, vaulted ceilings, wet bar, damage from a hazard (e.g., hail damage hits on one or more roof segments (e.g., as normally determined via a hail test square count), leaks, broken windows or glass, roof wear, mold, fire, fallen tree, water wall, water ceiling, water floor, etc.), etc.), cause a camera of the user device 101 to be activated, obtain image data corresponding to a scene at which the camera of the user device 101 is pointed (e.g., where the image data may be an image file generated for the purpose of analyzing whether a user is pointing the camera at the requested content and may be generated prior to a user or the photo capture application itself capturing an image for storage in memory of the user device 101), apply the image data as an input to an image recognition model, and output a notification or warning to the user based on the output of the image recognition model.

As another example, if the image recognition system 110 performs at least some of the processing, the user device 101 may execute a verification application and/or photo capture application that collectively allow a user to access a content page generated by the image recognition system 110, prompt a user to provide one or more images for one or more types of objects or items, cause a camera of the user device 101 to be activated, obtain image data corresponding to a scene at which the camera of the user device 101 is pointed (e.g., where the image data may be an image file generated for the purpose of analyzing whether a user is pointing the camera at the requested content and may be generated prior to a user or the photo capture application itself capturing an image for storage in memory of the user device 101), and provide the image data to the image recognition system 110. The image recognition system 110 (e.g., the artificial intelligence-based image feature processor 113) may then apply the image data as an input to an image recognition model, and the image recognition system 110 (e.g., the imagery application controller 111) can instruct the photo capture application and/or the verification application to output a notification to the user based on the output of the image recognition model.

Given that an image recognition model may be associated with a specific type of object or item, the user device 101 or image recognition system 110 can retrieve an image recognition model (e.g., from the image recognition system 110) that is associated with the type of object or item of which the content page is requesting the user upload an image. If the content page requests that the user upload multiple images of different types of objects or items, then the user device 101 or image recognition system 110 can retrieve multiple image recognition models, one for each type of object or item. Once retrieved, the user device 101 or image recognition system 110 can apply image data or a captured image as an input to the retrieved image recognition model to obtain an output (e.g., an indication of whether the user is or is about to capture an image of the requested content).

As described herein, if the output of an image recognition model indicates that at least one expected feature is found (e.g., indicating that the user has or is about to capture an image of requested content), then the image recognition system 110 or the verification application can cause the photo capture application to display a notification indicating that the user has or is about to capture an image of the appropriate content (and optionally can prompt the user to capture the image for storage as an image file in memory of the user device or can automatically capture the image without user interaction). If the output indicates that some or none of the expected features are found (e.g., indicating that the user has or is about to capture an image that is of something other than the requested content), then the image recognition system 110 or the verification application can cause the photo capture application to display a notification or warning indicating that the user has or is about to capture an image of incorrect content and to point the camera of the user device in a different direction, such as in a direction where the requested content may be located. In particular, the notification may include information indicating what the requested content may look like and/or where the requested content may be located, with the notification optionally including one or more images captured in the past of the specific object or item.

Figure 1B:
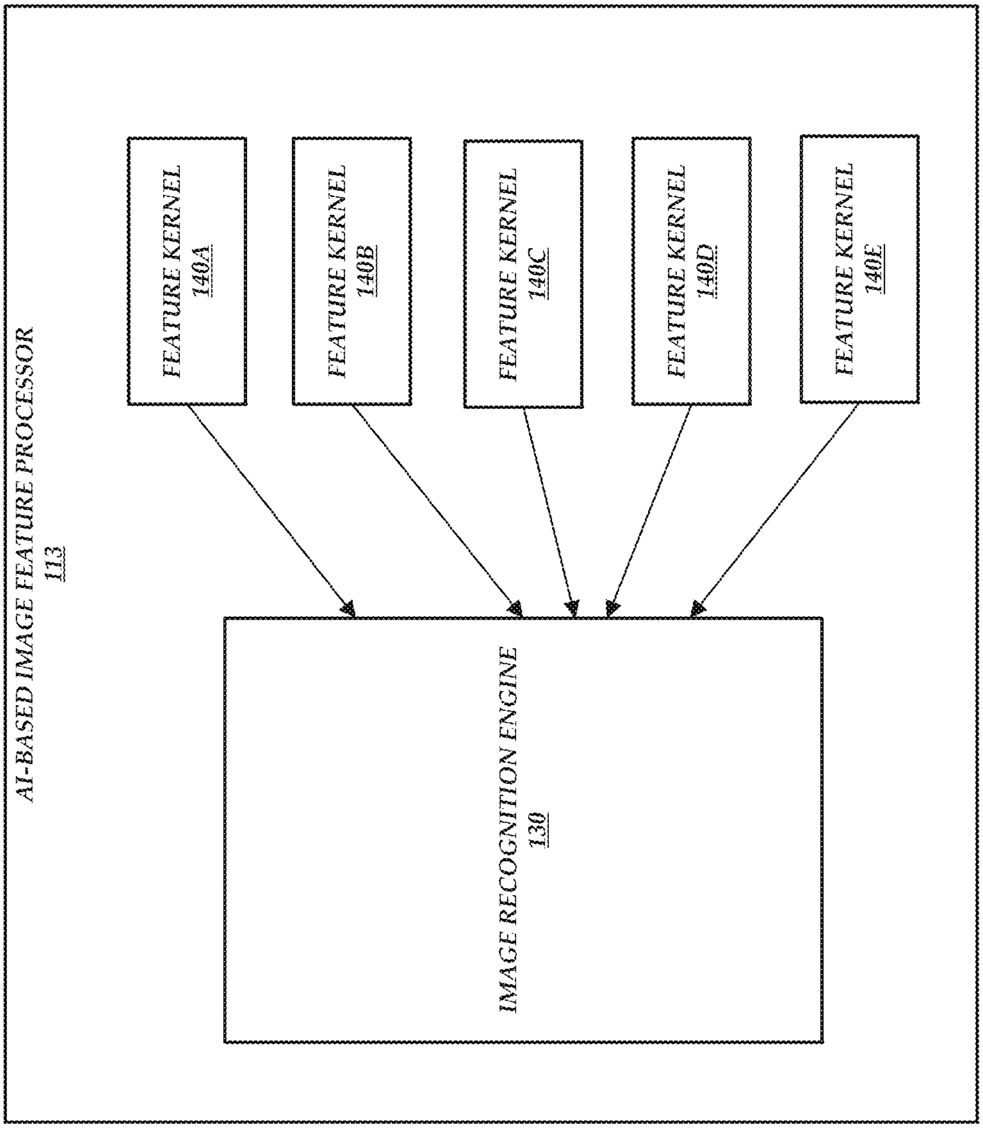
FIG. 1B is an exemplary block diagram of an architecture of the artificial intelligence-based image feature processor 113.

FIG. 1B is an exemplary block diagram of an architecture of the artificial intelligence-based image feature processor 113. The artificial intelligence-based image feature processor 113 may include an image recognition engine 130 and one or more feature kernels 140A-E.

A feature kernel 140 may be a filter trained (e.g., by the image recognition model trainer 112) to detect a certain feature in an image. An image recognition engine 130 may use one or more feature kernels 140A-E to detect one or more features in an image.

The network 102 may include any wired network, wireless network, or combination thereof. For example, the network 102 may be a personal area network, local area network, wide area network, over-the-air broadcast network (e.g., for radio or television), cable network, satellite network, cellular telephone network, or combination thereof. As a further example, the network 102 may be a publicly accessible network of linked networks, possibly operated by various distinct parties, such as the Internet. In some embodiments, the network 102 may be a private or semiprivate network, such as a corporate or university intranet. The network 102 may include one or more wireless networks, such as a Global System for Mobile Communications (GSM) network, a Code Division Multiple Access (CDMA) network, a Long Term Evolution (LTE) network, or any other type of wireless network. The network 102 can use protocols and components for communicating via the Internet or any of the other aforementioned types of networks. For example, the protocols used by the network 102 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Example State Diagrams

Figure 2:
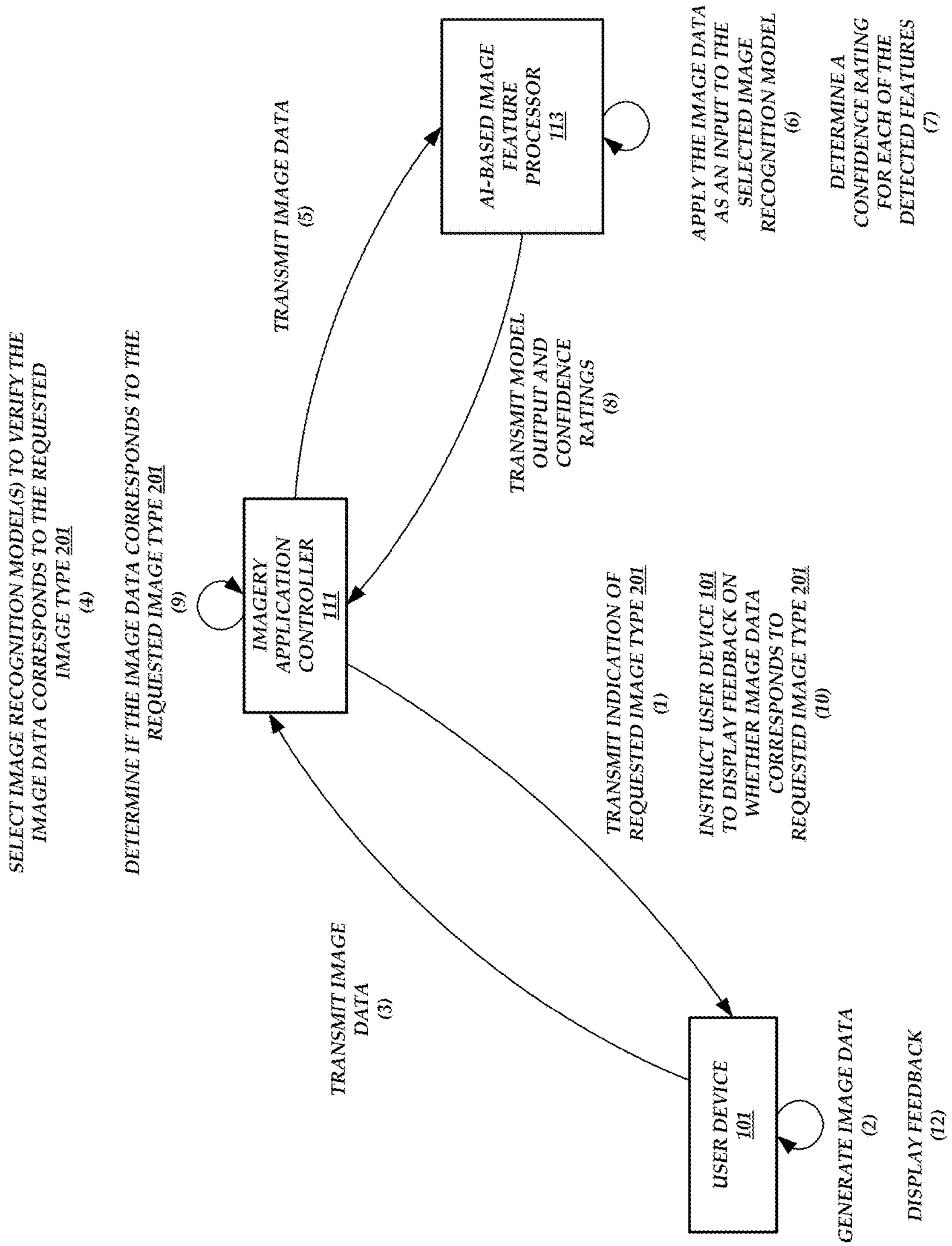
FIG. 2 illustrates an example state diagram that depicts the process of determining if an image captured or to be captured by a user device 101 matches a requested image type 201.

FIG. 2 illustrates an example state diagram that depicts the process of determining if an image captured or to be captured by a user device 101 matches a requested image type 201. As illustrated in FIG. 2, an entity may select the requested image type 201 (e.g., via a second user device 101) and cause the imagery application controller 111 to transmit an indication of the requested image type 201 to the user device 101 at (1). The image type 201 may be an image of a specific type of object or item. The object or item type may be defined by one or more visible features.

The user device 101 can activate a camera and generate image data at (2). For example, the image data may be an image file generated by a photo capture application that depicts a scene in view of the camera. The generated image file may be an image captured by the user, where the image file has been stored to memory of the user device 101. Alternatively, the generated image file may not be an image captured by the user or automatically by the user device 101. Rather, the generated image file may be a temporary file generated by the photo capture application for the purpose of analyzing content depicted in the scene in view of the camera. The image file that is eventually captured by the camera in response to user input or automatically by the photo capture application may be different than the temporary file because the user may move and/or time may pass before the image capture actually occurs. The temporary file may be different than the image file that is eventually captured even if the temporary file depicts the requested content. The user device can transmit the image data to the imagery application controller 111 at (3).

The imagery application controller 111 can select one or more image recognition models to verify that the image data corresponds to the requested image type 201 at (4). For example, the imagery application controller 111 can use image feature mapping to make the verification. An image feature mapping may map feature kernels 140 in the artificial intelligence-based image feature processor 113 to the feature(s) that define the certain image type 201. This image feature mapping may be used to determine which image recognition model(s) can be used to detect certain features in image data, such as features that define a particular image type. The features that define an image type may map to feature kernels within one or more artificial intelligence-based image feature processors 113. The imagery application controller 111 can transmit the image data and/or an indication of the selected image recognition model(s) to the artificial intelligence-based image feature processor 113 at (5)

The artificial intelligence-based image feature processor 113 can apply the image data as an input to the selected image recognition model at (6), which may cause the selected image recognition model to output an indication of whether one or more features that define the image type 201 are present in the image data. Optionally, the artificial intelligence-based image feature processor 113 can determine a confidence rating for each of the detected features at (7) (e.g., where the confidence rating may indicate a confidence that the detected feature corresponds to an expected feature of an object or item). The artificial intelligence-based image feature processor 113 can transmit the output and/or the confidence rating(s) to the imagery application controller 111 at (8).

The imagery application controller 111 can use the model output and/or the confidence ratings to determine if the image data corresponds to the requested image type 201 at (9). The imagery application controller 111 can then instruct the user device 101 to display feedback on whether the image data corresponds to the requested image type 201 at (10). The feedback may include a prompt to adjust the image capture if the image data does not correspond to the requested image type 201.

The confidence ratings may be used to determine whether a feature of a particular type of object or item was detected in the image data. For example, the imagery application controller 111 may determine that a feature of a particular type of object or item is depicted in the image data if the confidence rating for that feature is above a threshold level. Likewise, the imagery application controller 111 may determine that a feature of a particular type of object or item is not depicted in the image data if the confidence rating for that feature is below a threshold level. The imagery application controller 111 may consider the confidence ratings individually or collectively in determining whether the image data corresponds to the requested image type 201. For example, if the confidence rating for at least one feature of an object or item is above the threshold level, then the imagery application controller 111 may determine that the image data corresponds to the requested image type 201. In general, the imagery application controller 111 may use the confidence ratings, the number of features that are detected, the number of features that are not detected, and/or other data in making a determination as to whether the image data corresponds to the requested image type 201.

As discussed herein, the user device 101 rather than the image recognition system 110 can make the determination as to whether the image data corresponds to the requested image type 201. For example, operations (4), (6), (7), (9), and/or (10) can alternatively be performed by the user device 101 instead of the image recognition system 110. Thus, the user device 101 can locally determine whether the user has or is about to capture an image depicting requested content.

In further embodiments, the user device 101 and/or the image recognition system 110 can use other data in addition to the image data to determine whether an image that the user device 101 has or is about to capture depicts requested content. For example, the user device 101 may detect the weather at a location of the user device 101 when the image data was generated, the direction the camera was facing (e.g., North, South, East, West, etc.) when the image data was generated, the elevation of the user device 101 when the image data was generated, a time at which the image data was generated, and/or the like. Some or all of these factors may affect how a feature of an object or item appears at any given time. Incorporating these factors into the determination of whether a feature of an object or item is depicted in the image data can improve the quality of the image recognition model outputs because different features may appear different at different times of the day and these differences can be taken into account. In particular, the images in the training data may be further annotated to indicate the weather at a location of a user device 101 when the respective image was captured, the direction the camera was facing when the respective image was captured, the elevation of a user device 101 when the respective image was captured, a time at which the image was captured, and/or the like. The image recognition model trainer 112 can train one or more image recognition models using this training data. As a result, an image recognition model, once trained, may be configured to output an indication of the features detected in image data when the image data and/or this other data is applied as an input to the image recognition model.

Figure 3:
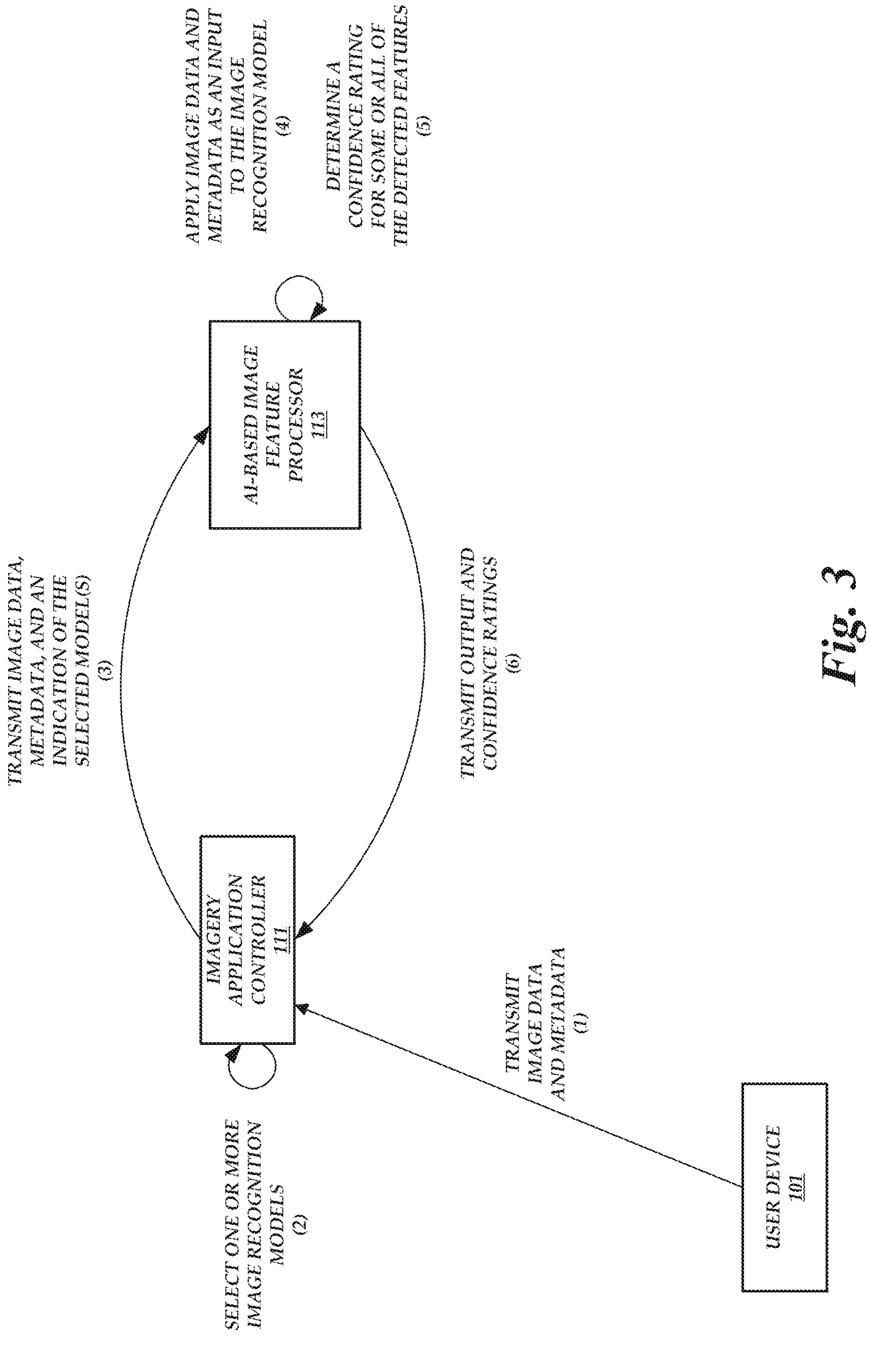
FIG. 3 illustrates an example state diagram depicting the process of detecting one or more features in an image using additional factors.

FIG. 3 illustrates an example state diagram depicting the process of detecting one or more features in an image using additional factors. As illustrated in FIG. 3, the user device 101 may transmit image data and metadata to the imagery application controller 111 at (1). The metadata may include the weather at a location of the user device 101 when the image data was generated, the direction the camera was facing (e.g., North, South, East, West, etc.) when the image data was generated, the elevation of the user device 101 when the image data was generated, a time at which the image data was generated, and/or the like.

The imagery application controller 111 can select one or more image recognition models to use to detect features in the image data at (2). The imagery application controller 111 can then transmit the image data, the metadata, and an indication of the selected model(s) to the artificial intelligence-based image feature processor 113 at (3).

The artificial intelligence-based image feature processor 113 can apply the image data and the metadata as an input to the selected image recognition model at (4), which may cause the selected image recognition model to output an indication of one or more features detected in the image data. Optionally, the artificial intelligence-based image feature processor 113 can also determine a confidence rating for some or all of the detected features at (5). The artificial intelligence-based image feature processor 113 can transmit the output and/or the confidence rating(s) to the imagery application controller 111 at (6). The imagery application controller 111 may then instruct the user device 101 to provide a suggestion to the user as described herein.

In further embodiments, the trained image recognition models may be configured to output an indication of whether a caption (or image tag or descriptor) of an image provided by a user is correct. For example, a user may caption an image to be uploaded via the content page, where the caption identifies a type of object or item depicted in the image. Based on the user-provided caption, the user device 101 and/or image recognition system 110 can select an image recognition model that is associated with the type of object or item identified in the user-provided caption. The user device 101 and/or image recognition system 110 can then apply the image as an input to the selected image recognition model, which causes the image recognition model to output an indication of one or more features detected in the image. The user device 101 and/or image recognition system 110 can then compare the detected features to the features expected to be depicted in an image of an object or item identified by the caption. If there is at least a partial match, then the user device 101 and/or image recognition system 110 may determine that the user-provided caption is accurate. However, if there are no matches or the number of matches is below a threshold value, then the user device 101 and/or image recognition system 110 may determine that the user-provided caption is inaccurate. Optionally, the user device 101 and/or image recognition system 110 can determine what object or item is defined by the detected features, and suggest to a user that the user re-caption the image to identify the determined object or item. Similarly, if no caption is present, the user device 101 and/or image recognition system 110 can use the output of the image recognition model to determine the type of object or item depicted therein and/or to suggest and/or automatically caption an image (e.g., automatically caption an image to indicate that the image depicts an object or item defined by the detected features, to indicate that the image depicts one or more detected features (where a feature can be a piece or component of the an object or item, a location of an object or item, damage to the object or item, etc.), and/or the like).

Captions (or image tags or descriptors), whether user-provided or automatically generated by the user device 101 and/or the image recognition system 110, can be used to automatically complete compliance tasks (e.g., compliance tasks established by the company for which the user works, the franchisor of that company, or the insurance carrier associated to the claim), arrange and/or filter images that have been uploaded, and/or create image reports that are categorized and/or indexed by the captions. The user device 101 and/or the image recognition system 110 may implement these features.

Example Use Cases

Generally, an entity may be able to configure the content page to define one or more images that are requested and to include the option for the user to caption one or more uploaded images.

Figure 4A:
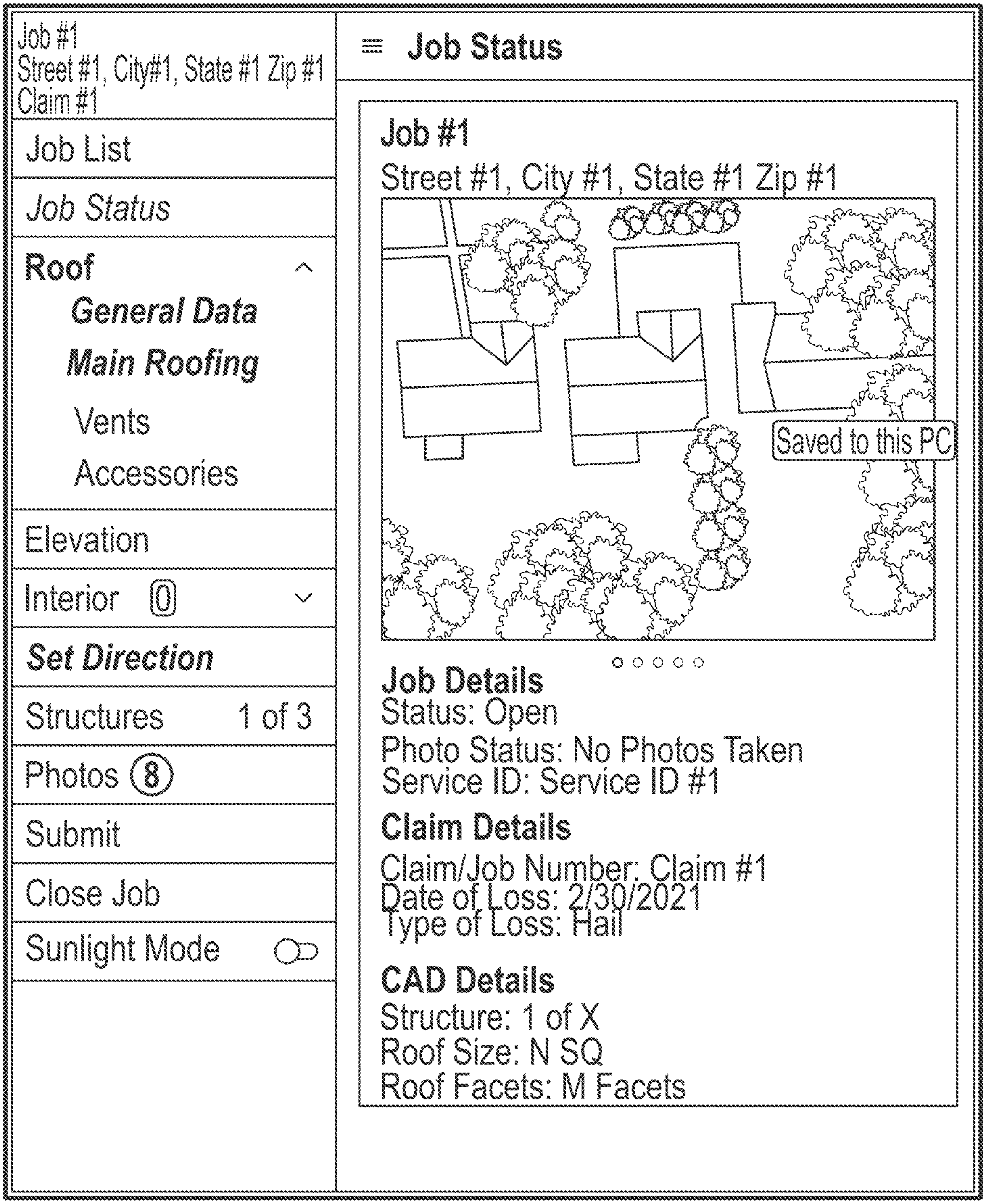
FIGS. 4A-4F illustrate an example content page.

FIGS. 4A-4F illustrate an example content page. As illustrated in FIG. 4A, the content page depicts an image of a parcel, information about the parcel, and an indication that eight images of the parcel are being requested.

Figure 4B:
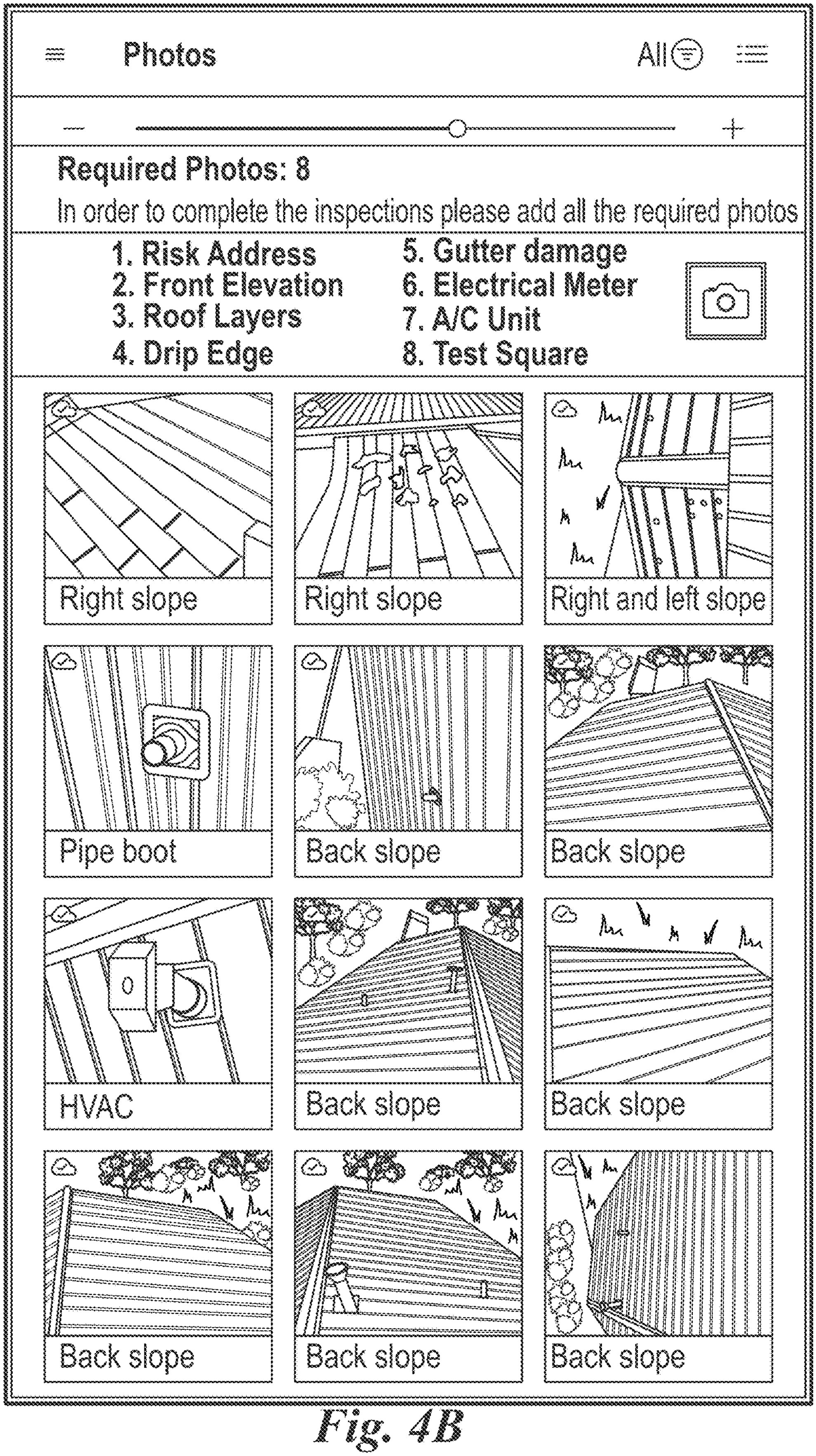

As illustrated in FIG. 4B, the user has selected a photos tab, which causes the content page to display a list of images that are being requested. In particular, the content page identifies the types of images to capture (e.g., risk address, front elevation, roof layers, drip edge, gutter damage, electrical meter, air conditioning unit, test square, etc.) and includes a camera icon that, when selected, opens the photo capture application. Here, the user has already captured, uploaded, and/or captioned several images related to roof layers (e.g., right slope, right and left slope, pipe boot, back slope, heating and ventilation air conditioning unit, and/or the like. Alternatively, the user device 101 and/or image recognition system 110 may have automatically captioned some or all of the uploaded images.

Figure 4C:
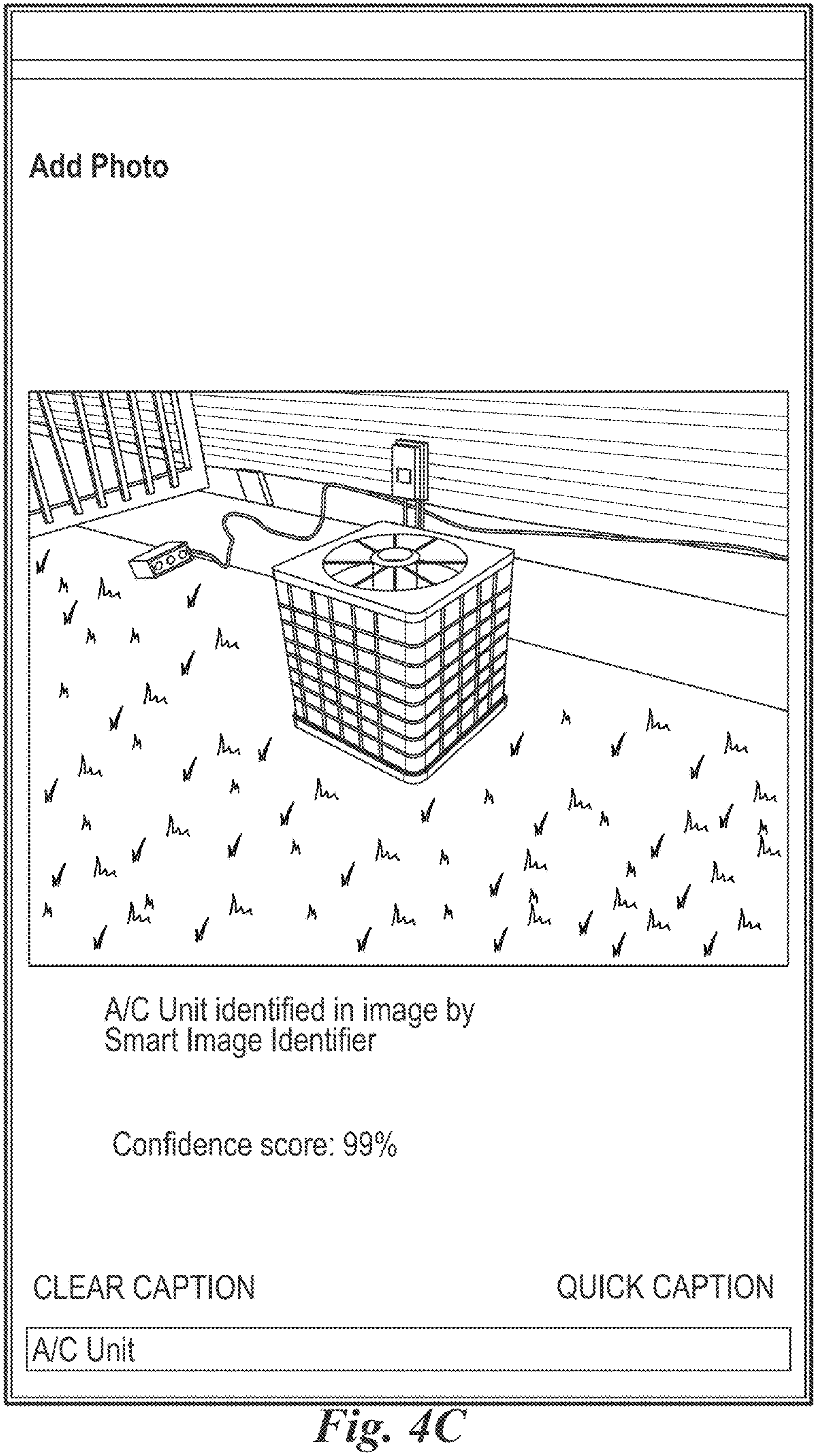

As illustrated in FIG. 4C, the user has captured an image via the user device 101. The user device 101 and/or the image recognition system 110 may apply the image as an input to an image recognition model, which may output an indication of one or more features depicted therein and/or a confidence score or rating. The user device 101 and/or image recognition system 110 may then identify an object or item that is defined by the detected features and apply a corresponding label or caption to the image. The content page may further display the confidence score or rating.

Figure 4D:
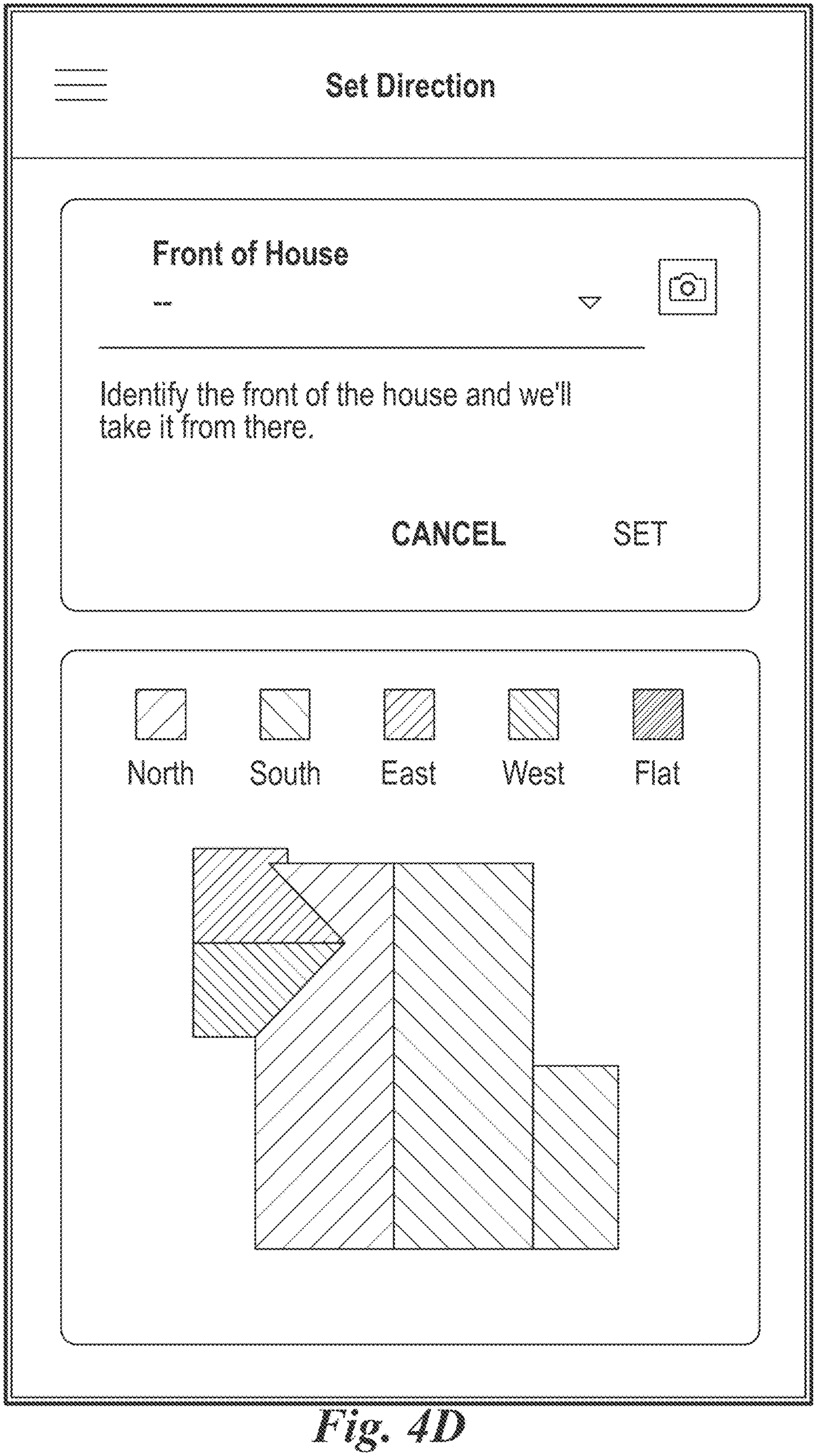

As illustrated in FIG. 4D, the user is prompted to capture an image of a front of a house and to indicate a direction in which the front of the house faces. The direction information can be used to select an image recognition model that was trained using images that captured a particular item or object (e.g., the front of the house) from the same direction as indicated by the user, which causes the user device 101 and/or image recognition system 110 to produce more accurate outputs.

Figure 4E:
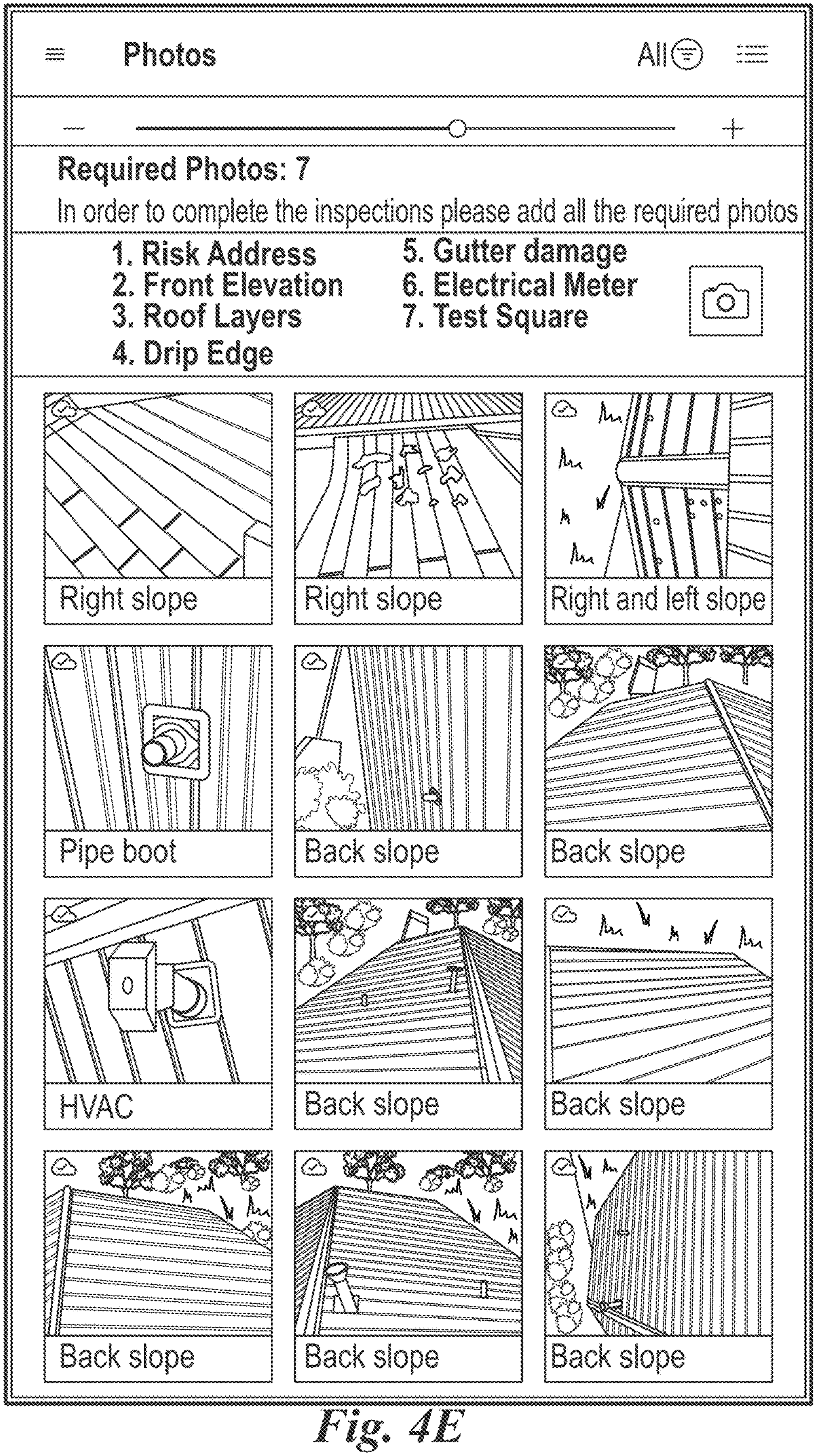

As illustrated in FIG. 4E, the user has uploaded a new image, and therefore the content page indicates that only seven additional images are being requested.

Figure 4F:
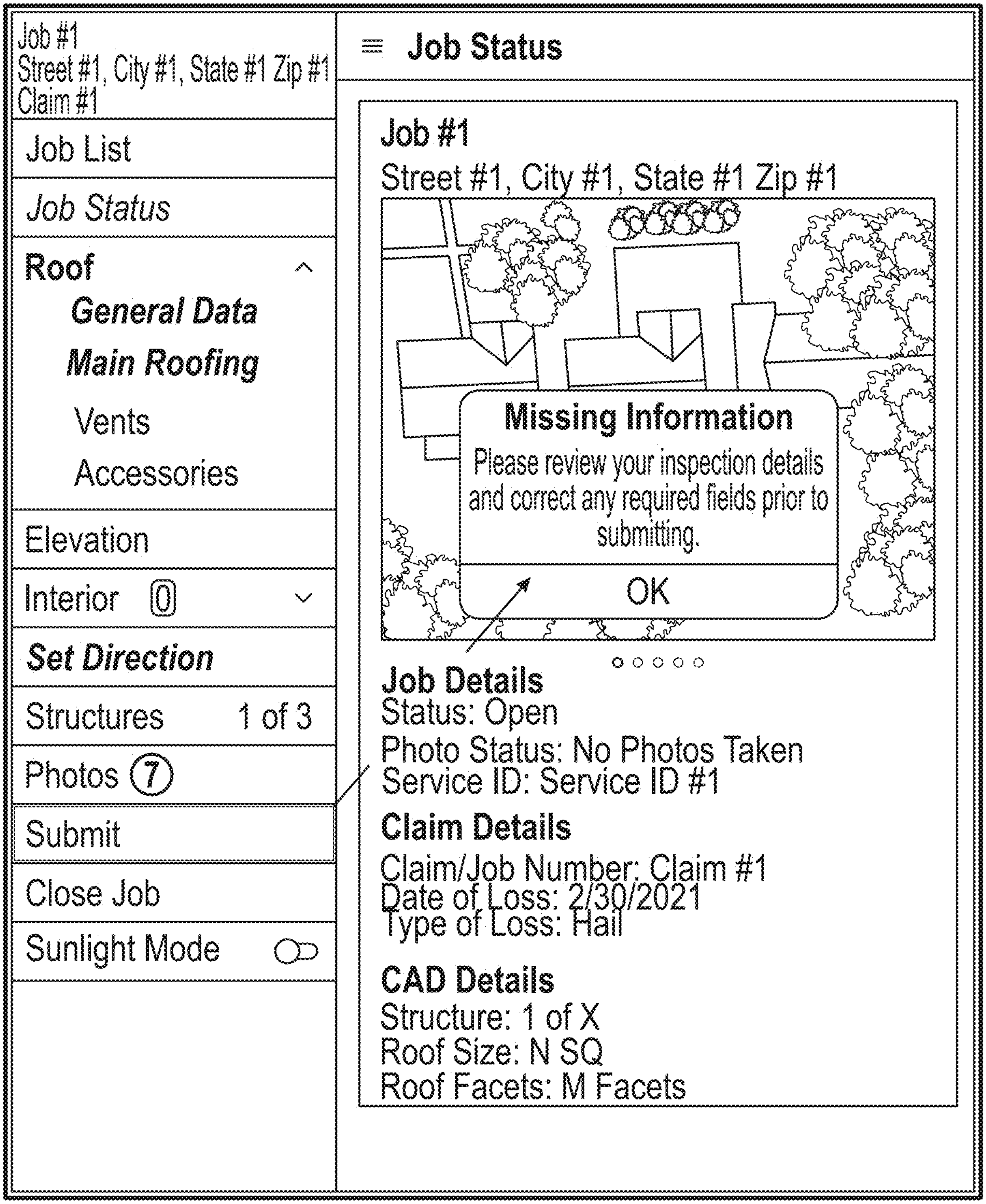

As illustrated in FIG. 4F, a user tries to submit parcel information, but is unable to do so because seven images that have been requested have not been provided.

As an example, the image recognition system 110 is used to assist in drawing conclusions using, in part, detected features from one or more images. In one example, images of parts of a real estate property, such as shots of the exterior and/or interior of a house may be taken by a user device 101. These images are then transmitted to the imagery application controller 111. The imagery application controller 111 may implement algorithms to determine damage present on the property and/or an estimate for repairs in an audit of the property. These algorithms will take as inputs, features such as roof condition, floor condition, mold, fire damage, etc. detected from the images.

As another example, there may be a set of requested images that are to be taken for a specific use. The image recognition system 100 may track verified photos within the imagery application. Each photo may be verified using the processes depicted in the state diagram of FIG. 2. One example of this may be shots of the roof, vents, and/or flooring of a house being requested by the imagery application process 111 in the process of submitting an insurance claim for the house.

Features detected in images can be used to tag, caption, or otherwise describe the image. These images can then be used more aptly in subsequent use. This could include, for example, recognizing features in an image of a broken, two-paneled window and tagging it as "window," "two-paneled," and/or "damaged."

Image Analysis Routine

Figure 5:
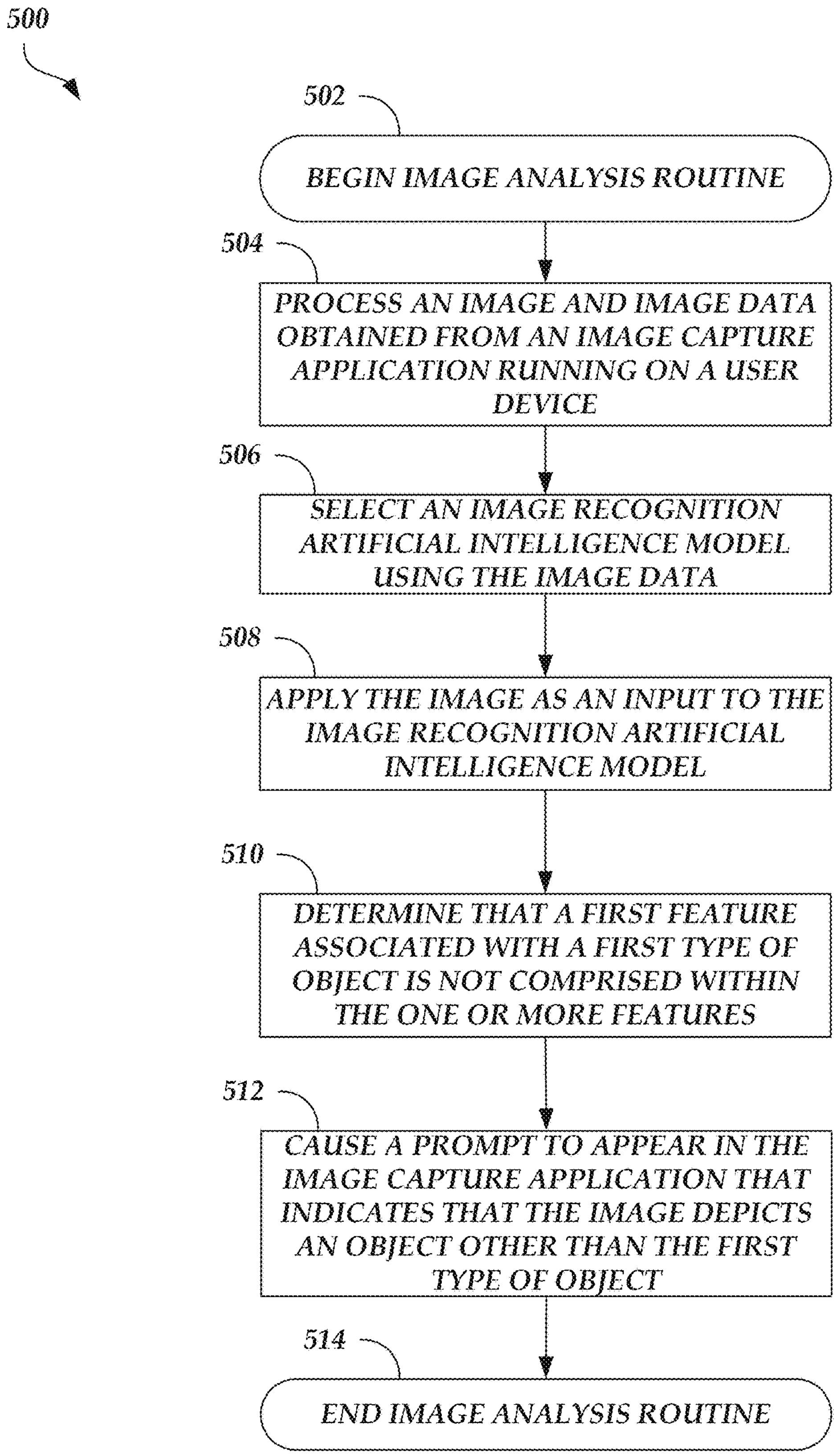
FIG. 5 is a flow diagram depicting an image analysis routine, according to one embodiment.

FIG. 5 is a flow diagram depicting an image analysis routine 500, according to one embodiment. As an example, the image recognition system 110 can be configured to execute the image analysis routine 500. The image analysis routine 500 begins at block 502.

At block 504, an image and image data obtained from an image capture application running on a user device is processed. For example, the image may be obtained from the image capture application prior to a user selecting an option to capture the image.

At block 506, an image recognition artificial intelligence model is selected using the image data.

At block 508, the image is applied as an input to the image recognition artificial intelligence model. For example, the image recognition artificial intelligence model may output an indication of one or more features in the image.

At block 510, a determination is made that a first feature associated with a first type of object is not comprised within the one or more features.

At block 512, a prompt is caused to appear in the image capture application that indicates that the image depicts an object other than the first type of object. The prompt may be caused to appear in response to the determination that the first feature associated with the first type of object is not comprised within the one or more features. The prompt may further instruct a user to adjust image capture. After the prompt is caused to appear in the image capture application, the image analysis routine 500 ends, as shown at block 514.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for performing image analysis, the system comprising:

a memory that stores computer-executable instructions; and a processor in communication with the memory, wherein the computer-executable instructions, when executed by the processor, cause the processor to:

process a received requested image type, the requested image type identifying an object to be captured by an image capture application on a user device;

process an image and image data obtained from the image capture application running on the user device, wherein the image is obtained prior to a user selecting an option to capture the image by the image capture application and prior to storing the image, by the image capture application, in a memory of the user device;

select an image recognition artificial intelligence model using the requested image type;

apply the image as an input to the image recognition artificial intelligence model, wherein the image recognition artificial intelligence model outputs an indication of one or more features in the image;

determine that a first feature associated with the object is not comprised within the one or more features; and in response to the determination that the first feature associated with the object is not comprised within the one or more features, cause the image capture application to display a prompt to appear in the image capture application prior to the user selecting an option to capture the image and prior to the image capture application storing the image in the memory of the user device, wherein the prompt indicates that the image depicts an object other than the object and instructs the user to adjust image capture.

2. The system of claim 1, wherein the image data comprises data indicating at least one of a direction from which the image was captured or an elevation at which the image was captured.

3. The system of claim 1, wherein the image recognition artificial intelligence model is a model trained to recognize a set of one or more features within a scene.

4. The system of claim 3, wherein the scene comprises a portion of a real estate property.

5. The system of claim 1, wherein the computer-executable instructions, when executed, further cause the processor to determine a confidence rating for each feature found in the image.

6. The system of claim 5, wherein the prompt is caused to appear in response to the confidence rating for one feature of the one or more features being below a threshold value.

7. The system of claim 1, wherein the computer-executable instructions, when executed, further cause the processor to train the image recognition artificial intelligence model using training data that comprises an image annotated to indicate at least one of a weather at a location at which the image is captured, a direction a camera that captured the image was facing, or a time at which the image was captured.

8. A computer-implemented method comprising:

receiving a requested image type, the requested image type identifying an object to be captured by an image capture application on a user device;

receiving an image and image data obtained from the image capture application running on the user device, wherein the image is obtained prior to a user selecting an option to capture the image by the image capture application and prior to storing the image, by the image capture application, in a memory of the user device;

selecting an image recognition artificial intelligence model using the requested image type;

applying the image as an input to the image recognition artificial intelligence model, wherein the image recognition artificial intelligence model outputs one or more features in the image;

determining that a first feature associated with the object is not comprised within the one or more features; and in response to the determination that the first feature associated with the object is not comprised within the one or more features, causing the image capture application to display a prompt to appear in the image capture application prior to the user selecting an option to capture the image and prior to the image capture application storing the image in the memory of the user device, wherein the prompt indicates that the image depicts an object other than the object and instructs the user to adjust image capture.

9. The computer-implemented method of claim 8, wherein the image data comprises data indicating at least one of a direction from which the image was captured or an elevation at which the image was captured.

10. The computer-implemented method of claim 8, wherein the image recognition artificial intelligence model is a model trained to recognize a set of one or more features within a scene.

11. The computer-implemented method of claim 10, wherein the scene comprises a portion of a real estate property.

12. The computer-implemented method of claim 8, further comprising determining a confidence rating for each feature found in the image.

13. The computer-implemented method of claim 12, wherein the prompt is caused to appear in response to the confidence rating for one feature of the one or more features being below a threshold value.

14. The computer-implemented method of claim 8, further comprising training the image recognition artificial intelligence model using training data that comprises an image annotated to indicate at least one of a weather at a location at which the image is captured, a direction a camera that captured the image was facing, or a time at which the image was captured.

15. A non-transitory, computer-readable medium comprising computer-executable instructions for analyzing an image, wherein the computer-executable instructions, when executed by a computer system, cause the computer system to:

process a received requested image type, the requested image type identifying an object to be captured by an image capture application on a user device;

process an image and image data obtained from the image capture application running on the user device, wherein the image is obtained process a received requested image type, the requested image type identifying an object to be captured by an image capture application on a user device;

select an image recognition artificial intelligence model using the requested image type;

apply the image as an input to the image recognition artificial intelligence model, wherein the image recognition artificial intelligence model outputs one or more features in the image;

determine that a first feature associated with the object is not comprised within the one or more features; and in response to the determination that the first feature associated with the object is not comprised within the one or more features, cause the image capture application to display a prompt to appear in the image capture application prior to the user selecting an option to capture the image and prior to the image capture application storing the image in a memory of the user device, wherein the prompt indicates that the image depicts an object other than the object and instructs the user to adjust image capture.

16. The non-transitory, computer-readable medium of claim 15, wherein the image data comprises data indicating at least one of a direction from which the image was captured or an elevation at which the image was captured.

17. The non-transitory, computer-readable medium of claim 15, wherein the image recognition artificial intelligence model is a model trained to recognize a set of one or more features within a scene.

18. The non-transitory, computer-readable medium of claim 17, wherein the scene comprises a portion of a real estate property.

19. The non-transitory, computer-readable medium of claim 15, wherein the computer-executable instructions, when executed, further cause the computer system to determine a confidence rating for each feature found in the image.

20. The non-transitory, computer-readable medium of claim 19, wherein the prompt is caused to appear in response to the confidence rating for one feature of the one or more features being below a threshold value.

* * * * *